J. W. LEDOUX.
LIQUID METER.
APPLICATION FILED DEC. 9, 1909.
1,070,968.
Patented Aug. 19, 1913.
4 SHEETS—SHEET 1.
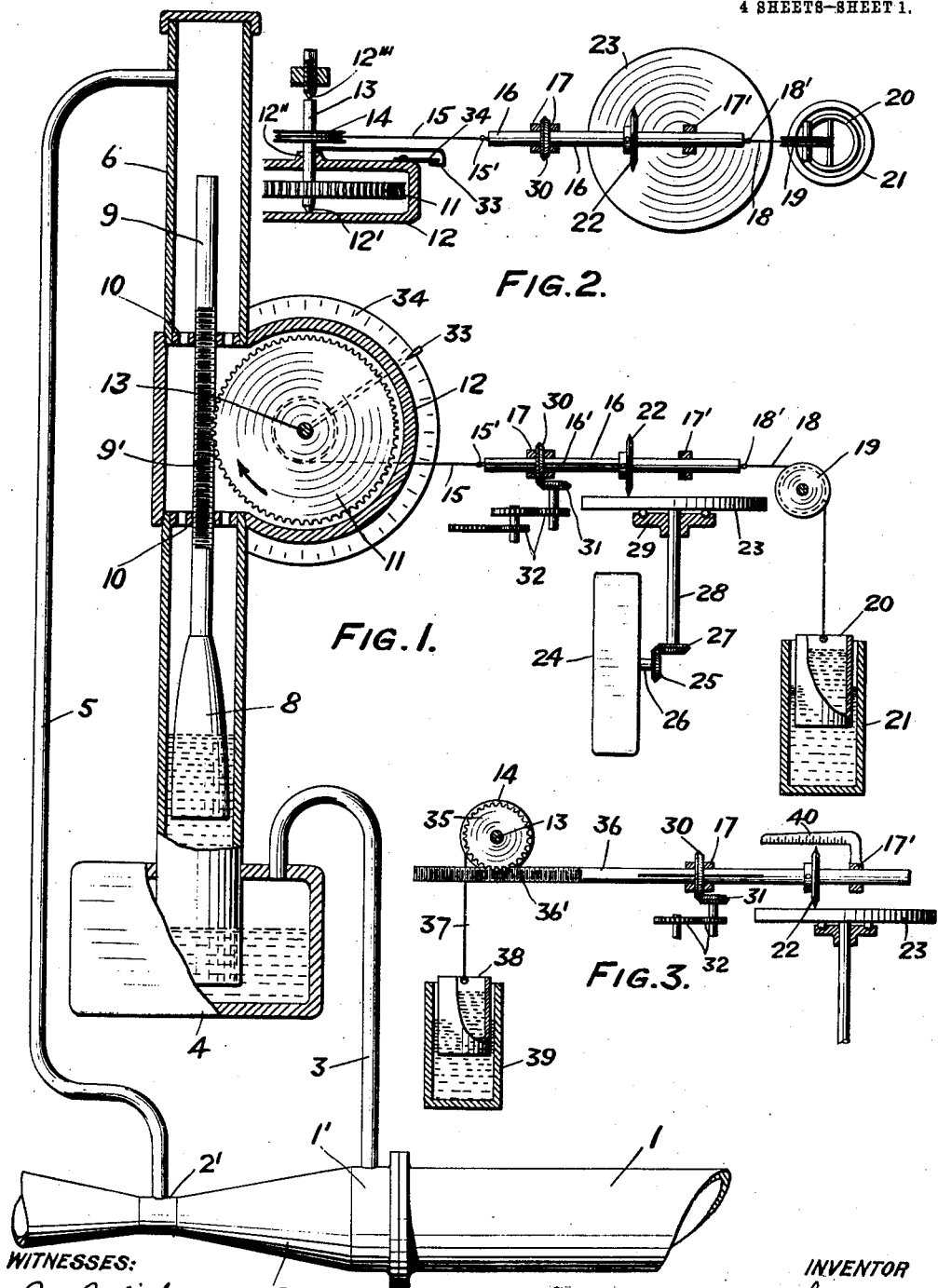

J. W. LEDOUX.
LIQUID METER.
APPLICATION FILED DEC. 9, 1909.

1,070,968.

Patented Aug. 19, 1913.

4 SHEETS—SHEET 2.

INVENTOR
John W. Ledoux
BY Charles N. Butler
ATTORNEY.

J. W. LEDOUX.
LIQUID METER.
APPLICATION FILED DEC. 9, 1909.

1,070,968.

Patented Aug. 19, 1913.
4 SHEETS—SHEET 4.

WITNESSES:
Rob't R. Kitchel.
Jos. G. Denny Jr.

INVENTOR
John W. Ledoux
BY Charles N. Butler
ATTORNEY.

UNITED STATES PATENT OFFICE.

JOHN W. LEDOUX, OF SWARTHMORE, PENNSYLVANIA.

LIQUID-METER.

1,070,968.

Specification of Letters Patent. Patented Aug. 19, 1913.

Application filed December 9, 1909. Serial No. 532,179.

*To all whom it may concern:*

Be it known that I, JOHN W. LEDOUX, a citizen of the United States, residing at Swarthmore, in the county of Delaware and State of Pennsylvania, have invented certain Improvements in Liquid-Meters, of which the following is a specification.

My invention is a meter having improved means for differentiating liquid pressures and integrating the flow thereof.

In the characteristic construction embodying my improvements a float is so shaped and balanced that its movement due to the differential pressures exerted by a flowing liquid will be a simple proportion of the rate of flow.

The characteristics of my improvements are fully disclosed in the following description and the accompanying drawings in illustration thereof.

Figure 5:
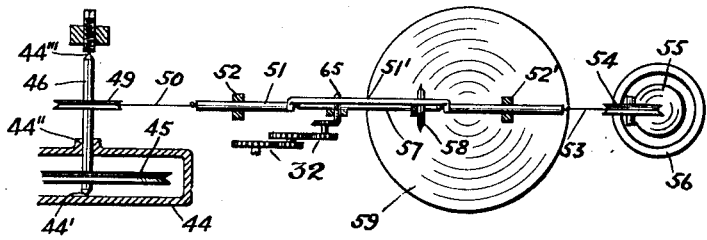
Figure 4:
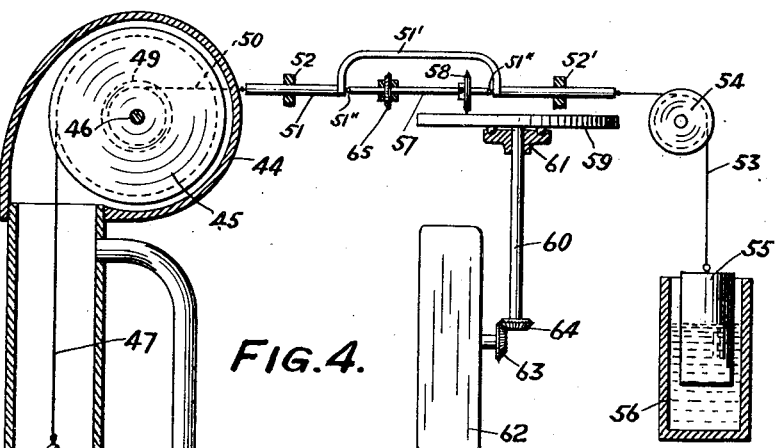
Figure 6:
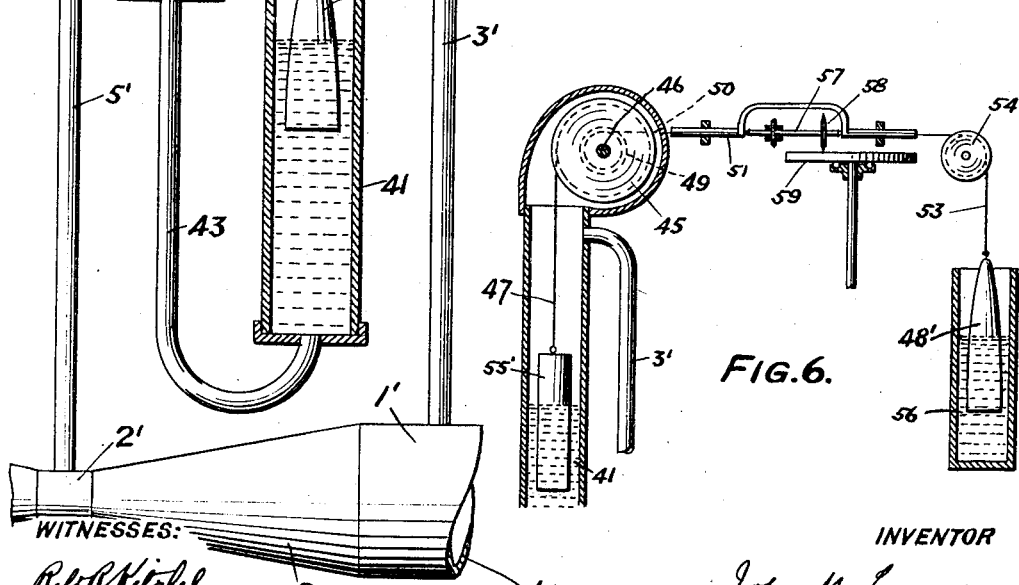
Figure 7:
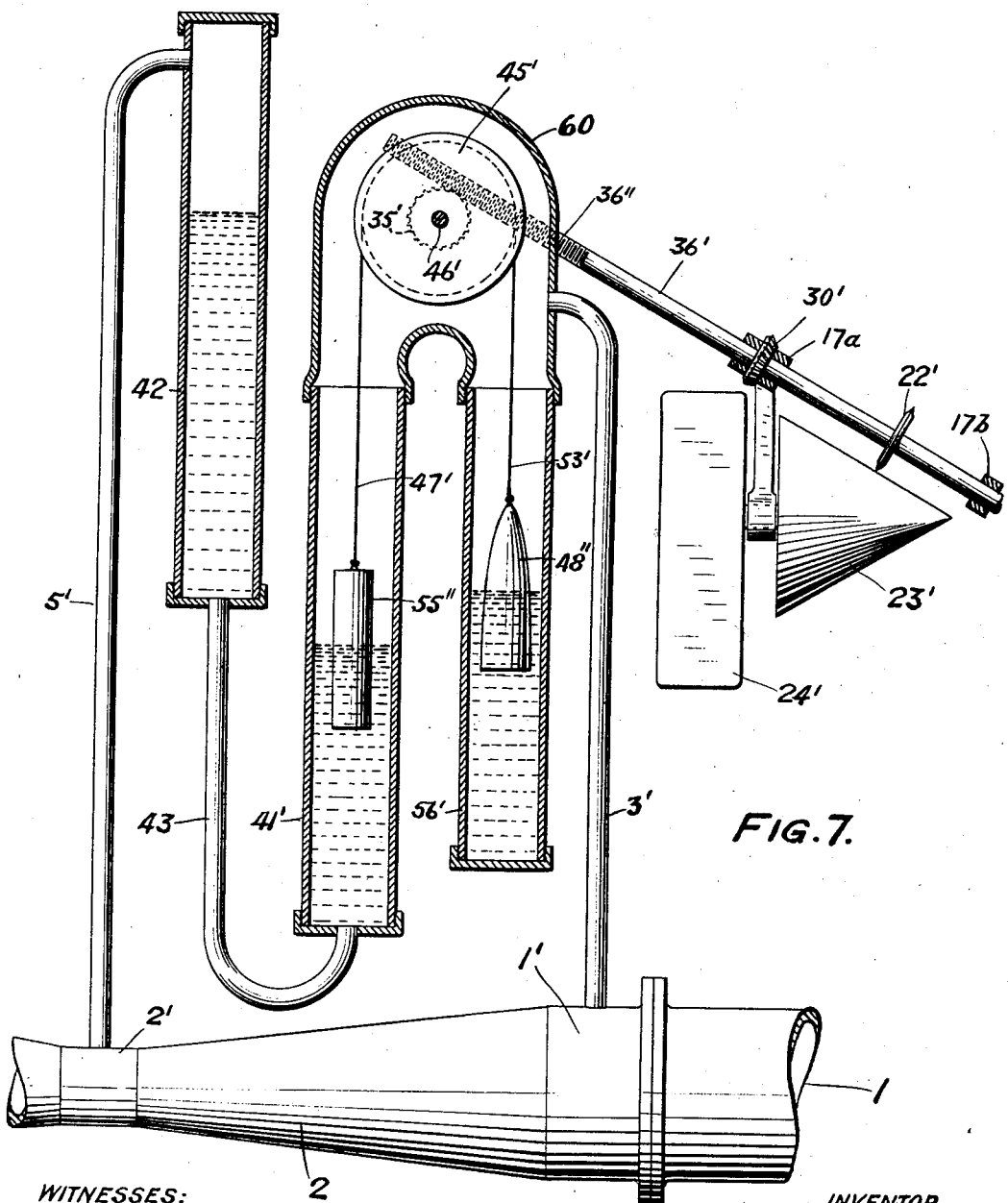
Figure 8:
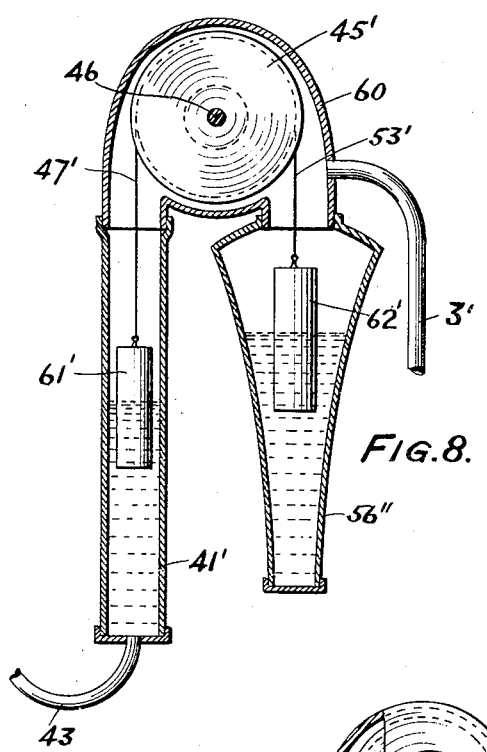
Figure 9:
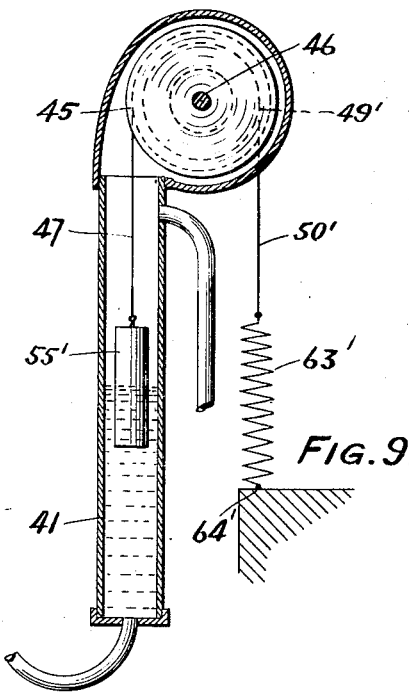
Figure 10:
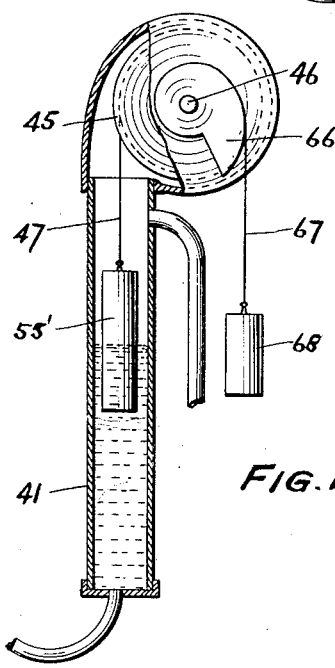

In the drawings, Figure 1 is a sectional elevation of apparatus embodying my improvements; Fig. 2 is a sectional plan view of part of the mechanism shown in Fig. 1; Fig. 3 is a sectional side elevation illustrating modifications in the details of the construction of the apparatus shown in Fig. 1; Fig. 4 is a sectional side elevation of a second form of apparatus embodying my improvements; Fig. 5 is a sectional plan view of part of the mechanism shown in Fig. 4; Fig. 6 is a sectional side elevation showing modifications in the details of the construction illustrated in Fig. 4; Fig. 7 is a sectional side elevation of a third form of apparatus embodying my improvements; Fig. 8 is a sectional elevation showing a modified construction using a tapered float chamber containing a float of uniform cross section; Fig. 9 is a sectional elevation illustrating a further modification in which a coiled spring is substituted for the counter-balancing float; and Fig. 10 is a sectional elevation illustrating a further modification in which a cam sheave and weight take the place of the spring.

In the form of apparatus shown in Figs. 1 and 2, the conduit 1, provided with a Venturi section 2, has its normal section 1' connected by a tube 3 with the top of a closed mercury reservoir 4 and the throat 2' of its Venturi section connected by a tube 5 with the top of a stand pipe 6 which extends through the top of the reservoir to a point near its bottom, the top of the stand pipe being closed and its bottom being open. A float 8, with a surface of revolution having a functional relation to the rate of flow in the conduit 1, is immersed, to a greater or less extent, in the mercury contained in the stand pipe and has a stem 9 which is movable freely through the guiding spiders 10 set in the stand pipe. A rack 9' on the stem 9 engages a gear 11 which is fixed on a shaft 13, in a closed casing 12 communicating with the stand pipe, the shaft being journaled by the bearings 12', 12", and 12'''. A sleeve 14 is fixed on the shaft 13, exterior to the casing 12, and is connected by a cord 15 through a swivel 15' with an end of the shaft 16, the latter being revoluble and longitudinally movable in the stationary bearings 17 and 17'. A cord 18, connected by a swivel 18' with the other end of the shaft 16, passes over a sheave 19 to a float 20 having uniform cross sectional areas immersed to a greater or less extent in mercury contained in a chamber 21. The shaft 16 has fixed thereon a disk 22 which is movable by the shaft toward and from the center of a disk 23 revolved at a constant rate by a clock 24, the disk 22 bearing upon and being revolved on its axis by the disk 23. The clock acts through the beveled gear 25 fixed to the shaft 26 thereof, the beveled gear 27 meshing with the gear 25, and the shaft 28 which is revolved by the gear 25 and revolves the disk 23, the latter being carried by the bearing 29 in which the shaft 28 is journaled. A beveled gear 30 is journaled in the bearing 17 and keyed to a longitudinal groove 16' of the shaft 16, which revolves the gear and moves longitudinally therethrough. A beveled gear 31 is driven by the gear 30 and drives the register train 32. A pointer 33 is fixed to the shaft 13 and moves over the uniformly graduated scale 34 to indicate the rate of flow in the conduit 1. When there is no flow in the conduit 1, the mercury and the float 8 occupy their lowest positions in the chamber 6, the float 20 occupies its lowest position in the chamber 21, and, the tension on the connecting members being relaxed, the float 8 has its least submergence and the float 20 its greatest. As the flow in the conduit passes from zero to the maximum, the differential pressures exerted through the conduits 3 and 5 lift the mercury in the chamber 6 and the float 8 is carried upward therewith, its stem 9 acting through the rack 9' to revolve the gear 11 in the direction of the arrow thereon. The movement thus communicated to the wheel 11 is communicated thereby, through the shaft 13 and sheave 14, to the cord 15, shaft 16, cord 18, and float 20; the disk 22 being moved therewith a proportionate distance from its position in the center of the disk 23 when the float 8 is in its lowermost position and the hand 33 being moved a proportionate distance over the scale 34. The gradually rising float 20, as its displacement gradually diminishes, exerts a gradually increasing force which acts through the described connections against the rising float 8, so that the submergence of the latter gradually increases as it is elevated by the mercury rising in the chamber 6 due to increasing velocity of flow. The float 20 having a uniform cross section, the force which it exerts upon the float 8 at various elevations varies according to a simple proportion and the configuration given the float 8 is such that its movement shall be a simple proportion of the velocity of flow in the conduit 1. Since the disk 22 is at the center of the disk 23 when the flow is zero and is moved therefrom proportionately to the change in the rate of flow, the constantly rotating disk 23 will rotate the disk 22, shaft 16, gear 30, gear 31, and register train 32 so as to integrate the flow and show the quantity thereof. The movement of the hand 33 is consequently a simple proportion of the change in the rate of flow and the graduations of the scale 34 are therefore made uniform.

In the modification shown in Fig. 3, a gear 35 is fixed on the shaft 13 and a shaft 36, revoluble and longitudinally movable in the bearings 17 and 17', has thereon a cylindrical rack 36' which is engaged by the gear 35. A cord 37 connects the sheave 14 on the shaft 13 with a cylindrical float 38 immersed to a greater or less degree in mercury contained in the chamber 39. The constantly rotating disk 23 revolves the disk 22 fixed on the shaft 36 and this motion is communicated by the shaft through the gear 30 (to which it is keyed and through which it moves) and the gear 31 to the register train 32. A uniformly graduated scale 40 is fixed to the bearing 17' and extends along the path of movement of the disk 32. In this modified construction, it will be understood that the float 38 is gradually elevated as the float 8 rises, and that the gear 35, revolved by the shaft 13, acts upon the rack 36' to move the disk 22 a proportionate distance from the center of the constantly revolving disk 23. The position of the disk 22 with relation to the scale 40 indicates the rate of flow and the movement of the disk 23 is communicated through the disk 22 and shaft 36 to operate the register gears 30, 31 and 32.

In the form of the invention shown in Figs. 4 and 5, the conduit 1 has its normal section 1' connected by the high pressure tube 3' with the upper part of a pressure chamber 41 and its Venturi section 2' connected by the low pressure tube 5' with the upper part of a pressure chamber 42, the tops of the pressure chambers being closed and their bottoms being connected by a tube 43. A casing 44, at the top of the chamber 41, contains a sheave 45 fixed on a shaft 46 which is revoluble in bearings 44', 44'', and 44'''. A cord 47 connects the sheave 45 with a float 48 which extends into mercury contained in the chamber 41 and the tube 43. A sheave 49, fixed on the shaft 46 exterior to the casing 44, is connected by a cord 50 with a shaft 51, which is movable longitudinally in the bearings 52 and 52', the shaft having connected therewith a cord 53 which passes over a sheave 54 to a connection with a cylindrical float 55 immersed to a greater or less degree in the mercury contained in a chamber 56. A loop 51', comprised in the shaft 51, admits a shaft 57, which is journaled in the bearings 51'' in the axis of the shaft 51. Fixed to the shaft 57 is the disk 58 which is movable in contact with the constantly rotating disk 59, from the center toward the periphery. The disk 59 is fixed to a shaft 60 which is journaled in the bearing 61, and this shaft is driven by a clock 62 acting through the meshing gears 63 and 64. A gear 65, revolved by the shaft 57 which moves therethrough, is adapted for operating a register train. When there is no flow in the conduit 1, equal pressures will be exerted through the conduits 3' and 5' with the result that the mercury and the float 48 will rise to their highest positions in the chamber 41 and the float 55 will fall to its lowermost position in the chamber 56. As the float 55 thus attains its maximum submergence, the minimum force is exerted thereby through its connections with the float 48, hence the latter attains its maximum submergence. As the flow in the conduit 1 increases from zero, the differential pressures, communicated through the conduits 3' and 5' to the chambers 41 and 42, cause the mercury in the chamber 41 to fall, which is accompanied by the fall of the float 48, against the gradually increasing resistance of the float 55, which is lifted by the weight of the float 48 acting through the connecting parts. The form of the float 48 and the resistance of the float 55 are of such character that the former moves downwardly at a rate slower than that of the mercury, such that the movement of each float is a simple proportion of the rate of flow. Consequently the positions of the floats, or of the parts connecting them, will indicate the rate of flow at any period of time. As the disk 58 moves away from the center of the disk 59 to a distance proportionate to the movement of the floats, the constantly revolving disk 59 will act through the disk 58 and shaft 57 so that the flow can be integrated by connecting a register with the gear 65.

As shown in Fig. 6, a cylindrical float 55' may be used in the pressure chamber 41 and a tapered float 48', similar to the float 48, may be used in the chamber 56. Here, as previously described, the floats are connected by the cord 47, sheave 45, shaft 46, sheave 49, cord 50, shaft 51 and cord 53 passing over the sheave 54; and the shaft 51 carries the shaft 57 having the disk 58 thereon, which makes contact with the constantly revolving disk 59. The operation, in this form of the aparatus, will be analogous to that of the structure shown in Figs. 4 and 5.

In the form of the invention illustrated in Fig. 7, the mercury chamber 41' has its top connected by the casing 60 with the top of the mercury chamber 56'. The conduit 1 has its normal section 1' connected by the high pressure tube 3' with the top of the chamber 41', as by a connection with the interior of the part 60; while the low pressure tube 5' connects the throat 2' of the contracted conduit section 2 with the top of the chamber 42, which has its bottom connected with the bottom of the chamber 41' by the tube 43. A sheave 45' is fixed on the shaft 46' which is journaled in the walls of the casing 60. A cord 47' connects the sheave with the plain float 55'', immersed to a greater or less extent in the mercury in the chamber 41', and a cord 53' connects the sheave with the tapered float 48'', immersed to a greater or less depth in mercury in the chamber 56'. A toothed wheel 35' is fixed on the shaft 46' exterior to the casing and engages a cylindrical rack 36'' of a shaft 36' which is revoluble and longitudinally movable in the bearings 17ª and 17ᵇ, the shaft moving longitudinally through and revolving a gear 30' journaled in the bearing 17ª and adapted for operating a register. A disk 22' is fixed to the shaft 36' and is revolved by contact with the surface of a cone 23' driven by a clock 24', the wheel being adapted for traveling between the apex and the base of the cone. When there is no flow in the conduit 1, the mercury in the chamber 41' and the float 55'' will rise to their highest positions and the float 48'' will fall to its lowest position in the chamber 56', the floats attaining their maximum submergence. As the flow in the conduit rises, the mercury in the chamber 41' and the float 55'' fall, while the float 48'' rises as a consequence thereof. Since the rising float 48'' exerts a gradually increasing resistance opposing the descent of the float 55'', the latter falls at a slower rate than the mercury in which it is immersed. This rate is dependent upon the shapes of the floats, which are such that their movements bear a simple ratio to changes in the rate of flow in the conduit. When the flow in the conduit drops to zero, with the float 55'' in its highest and the float 48'' in its lowest position, the floats act through the cords 47' and 53' upon the sheave 45' and the gear 35' to move the shaft 36' and the disk 22' so that the latter is at the apex of the cone 23'. In this position of the part 22', the shaft 36' and the gear 30' are not revolved. As the flow in the conduit rises, the corresponding movements of the floats are communicated through the intermediate mechanism to the shaft 36' and the disk 22' is moved toward the base of the cone a corresponding distance, with a corresponding revolution thereof, which is communicated through the shaft 36' to the register gear 30'.

As shown in Fig. 8, the chamber 41' may be connected by the casing 60 with a tapered chamber 56'', while the sheave 45' is connected by the cords 47' and 53' with the cylindrical floats 61' and 62' submerged to a greater or less extent in mercury in the respective chambers. When the mercury rises to its highest level in the chamber 41', at the time of minimum flow, the float 61' will rise to its highest and the float 62' will fall to its lowest position, both floats then attaining their maximum submergence. As the flow rises, the mercury and the float in the chamber 41' fall, the float falling more slowly than the mercury due to the gradually increasing resistance exerted by the float 62' which is elevated proportionately to the fall of the float 61'. The chamber 56'' is tapered so that the differences between the weights of the mercury displaced by the two floats, or the force which moves them, and the consequent distance which they move, shall be a simple proportion of the changes in the rate of flow to be measured.

As shown in Fig. 9, the cylindrical float 55' in the chamber 41 may be counter-balanced by connecting it (through the cord 47, sheave 45, shaft 46, sheave 49' and cord 50') with a coiled spring 63' fixed to an anchorage 64'. The spring exerts a gradually increasing resistance to the fall of the float 55' with the mercury in the chamber so that by means of a suitable spring the movement of the float may be made a simple proportion of changes in the rate of flow.

As shown in Fig. 10, the cylindrical float 55' in the chamber 41 may be counter-balanced by connecting it with a weight 68, through the cord 47, sheave 45, shaft 46, cam 66 and cord 67. The weight 68, through its variable lever arm provided by the cam 66, exerts a gradually increasing resistance to the fall of the float 55' with the mercury in the chamber, and, by reason of the design of the cam, the position of the float at any time will indicate the rate of flow to be measured.

Having described my invention, I claim:

1. In a liquid meter, a liquid chamber, a float in said chamber, a liquid pressure chamber, a float in said pressure chamber, mechanism conecting said floats, a revoluble device connected with and reciprocated by said mechanism, a second revoluble device which operates said device first named, and indicating mechanism operated by said device first named.

2. In a liquid meter, a liquid chamber, a float in said chamber, a liquid pressure chamber, a float in said chamber last named, means comprising a longitudinally movable device connecting said floats, a revoluble disk carried by said device, and a constantly revolving device which engages and revolves said disk.

3. In a liquid meter, a liquid pressure chamber, a float in said chamber, mechanism for counter-balancing said float, a disk connected with and movable axially by said mechanism, and a constantly revolving device having a surface engaging and revolving said disk.

4. In a liquid meter, a liquid pressure chamber, a float in said chamber, counter-balancing mechanism having means whereby it exerts a variable force on said float, a revoluble disk movable axially by said mechanism, a clock, and a device revolved by said clock, the periphery of said disk making contact with a surface of said device.

5. In a liquid meter, a liquid pressure chamber, a float in said chamber, a revoluble shaft, means for communicating the movement of said float to said shaft, a longitudinally movable device, means whereby said shaft moves said device, a revoluble device movable axially by said longitudinally movable device, means for revolving said revoluble device at different speeds in its different axial positions, and indicating mechanism operated by said revoluble device.

6. In a liquid meter, mechanism comprising a floating member, revoluble means, whereby said floating member is connected with said revoluble means, longitudinally reciprocating means connected with and operated by said revoluble means, and integrating mechanism regulated by said longitudinally reciprocating means.

7. In a meter, mechanism comprising a liquid and a movable float adapted to be submerged therein, means whereby differential pressures are conveyed to said liquid, said mechanism also comprising means whereby said float is counter-balanced so that its submergence in said liquid varies, and indicating mechanism controlled by said mechanism first named, said indicating mechanism comprising a revoluble device having a surface of revolution and a revoluble device movable in contact with said surface.

In witness whereof I have hereunto set my name this 6th day of December, 1909, in the presence of the subscribing witnesses.

JOHN W. LEDOUX.

Witnesses:
ROBERT JAMES EARLEY,
C. N. BUTLER.